UNITED STATES PATENT OFFICE.

HARRY A. NELON, OF CHARLOTTESVILLE, VIRGINIA.

METHOD OF CANNING CORN.

1,269,843. Specification of Letters Patent. Patented June 18, 1918.

No Drawing. Application filed August 9, 1917. Serial No. 185,309.

*To all whom it may concern:*

Be it known that I, HARRY A. NELON, a citizen of the United States, residing at Charlottesville, in the county of Albemarle and State of Virginia, have invented new and useful Improvements in Methods of Canning Corn, of which the following is a specification.

This invention is an improved method of canning corn on the cob.

Heretofore numerous attempts have been made to can or otherwise preserve corn on the cob, but such efforts have failed of practical commercial success by reason of the fact that by the methods heretofore in use, it is impossible to cook the corn sufficiently to render it edible, without destroying its flavor, rendering it undesirably tough, etc. The length of time and quantity of fuel required to cook the corn also tends to make the old methods prohibitive from a commercial standpoint.

One of the objects of the invention is to so treat corn on the cob, that the same may be thoroughly cooked, without in any manner detracting from its quality or flavor, and the cooking accomplished in far less time and with much lower fuel requirements than has heretofore been possible.

The invention will be hereinafter fully set forth and particularly pointed out in the claims.

In canning corn according to the present invention, the cob is provided in any suitable manner, with a central bore extending longitudinally therethrough, preferably by removing practically all of the cob, retaining only enough of the shell of the cob to hold the grains of corn together. After forming the bore through the cob, the corn, in any suitable quantities is placed in cans or similar receptacles, the selected ears being previously cut to a length somewhat shorter than the length of the can in which they are to be placed.

The cans are then filled with a boiling solution of water, sugar and salt in any desired proportion, after which each can and its contents is heated or "exhausted" in any suitable manner, and then permanently and hermetically sealed. The sealed can is then put through a cooking process, such for instance as is accomplished by passing it through a continuous agitating cooker.

The purpose of sealing the can quickly and cooking the corn within the closed can, is to retain the corn flavor, which would be lost in cooking it in an open vessel. Also the fact that the can is tightly closed during the cooking process, causes a generation of pressure within the can and against the corn, which causes the heat to penetrate more quickly than is possible in an open receptacle where the pressure is not obtainable. By making the ears of corn slightly shorter than the can (not more than one-half inch is necessary) the liquid within the can will circulate freely around the corn, and by providing the longitudinal bore in the cob, the cooking is greatly hastened because the heat is simultaneously applied both internally and externally, and the heat will penetrate the corn from the inside of the cob with practically the same rapidity with which it penetrates from the outside, thus requiring less than half the time that would be consumed if the bore were not present. In other words, the corn is cooked from the center of the cob at the same time that the exterior thereof is cooked, the internal and external temperature being about the same, thereby insuring rapid cooking without destroying the flavor of the corn, and with the expenditure of a minimum quantity of fuel.

I claim as my invention:

1. An improvement in the method of canning corn comprising cooking the same from the center of the cob with the same rapidity with which it is cooked from the exterior thereof.

2. An improvement in the method of canning corn comprising cooking the same on the cob by uniform external and internal heat simultaneously applied.

3. An improvement in the art of canning corn comprising causing the cooking action of heat to travel from the center of the cob outwardly.

4. An improvement in the art of canning corn comprising causing the cooking action of heat to travel from the center of the cob outwardly and also to simultaneously travel from the exterior of the cob inwardly.

5. The method of canning corn on the cob comprising providing the cob with a central longitudinal bore, and then cooking the same within a hermetically sealed receptacle.

6. The method of canning corn on the cob comprising removing all of the cob except a shell possessing sufficient body to retain the grains of corn in position, and then cooking the same within a sealed receptacle.

7. The method of canning corn on the cob comprising providing the cob with a central longitudinal bore, cutting the cobs to a length somewhat shorter than the length of the can in which they are to be placed, and finally cooking within said can after hermetically sealing the same.

8. The method of canning corn on the cob comprising providing the cob with a central longitudinal bore, placing the same within a can, filling the can with a boiling liquid, hermetically sealing the can, and finally cooking within the sealed can.

9. The method of canning corn on the cob comprising providing the cob with a central longitudinal bore, placing the same within a can, filling the can with a boiling liquid, hermetically sealing the can, and finally cooking within the sealed can and rolling the can during the cooking process.

In testimony whereof I have hereunto set my hand.

HARRY A. NELON.

Witnesses:
W. L. SMITH,
W. N. LUPTON.